UNITED STATES PATENT OFFICE

KARL BRAUN, OF VIENNA, AUSTRIA

DEVICE FOR CLEANING PIPE BOWLS

Application filed August 29, 1930, Serial No. 478,683, and in Austria June 7, 1930.

When pipes are being smoked solid residues bake in the pipe bowl which have to be removed from time to time, this being generally done by means of a knife or similar implement. This work requires time and is tedious and the hands and clothes of the person who does the cleaning are dirtied.

This invention relates to an apparatus for cleaning pipe bowls, consisting of a knife or similar implement mounted on an axle adapted to be rotated and shifted in the axial direction.

Figure 1:
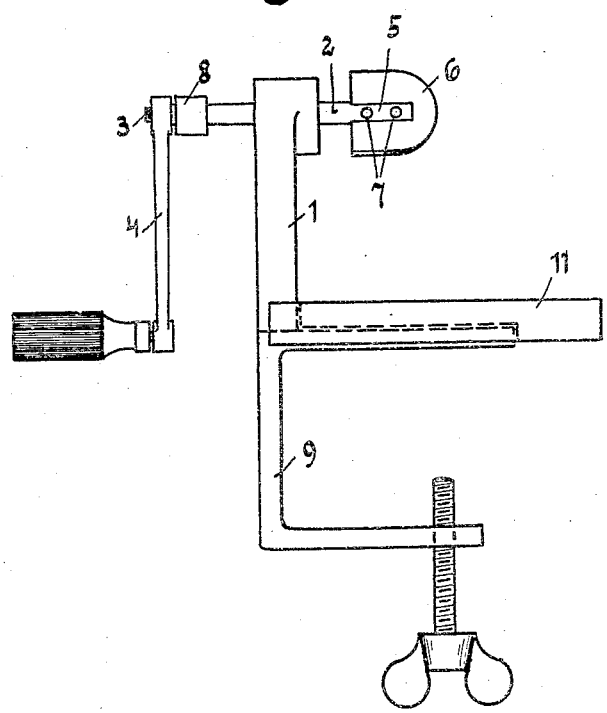

An embodiment of the invention is shown by way of example in the accompanying drawing in Fig. 1 in elevation.

Figure 2:
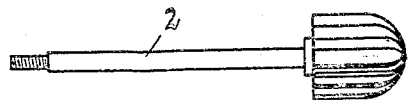

Fig. 2 shows in elevation the axle with the scraper.

In a bracket 1 an axle is journalled which has a screw threaded end 3 designed to receive a crank handle 4 and a slot in its other end 5 designed to hold a knife 6 or scraper fixed by means of screws or rivets 7. The width of the knife blades 6 is selected in accordance with the diameter of the pipe bowl to be cleaned. The axle 2 cannot only be easily rotated in the bearing in the bracket 1 but also shifted in the longitudinal direction. The distances for which the knife blade 5 penetrates into the pipe bowl can be limited by means of a sleeve 8 on the axle 2. This limiting of the distance is necessary in order to prevent damaging of the bottom of the pipe bowl, in case the apparatus has to be used for cleaning pipes, the hollow spaces in the bowls of which are of different depth. Instead of a knife blade 6 any other scraper may be used, for instance a scraper as shown in Fig. 2. To fix the apparatus on a table plate a bow 9 with nut 10 is provided. On a lateral arm of the bracket 1 a cup 11 of sheet metal is removably mounted, designed to collect the residues which have been removed from the pipe bowl. The knife blades 6 or scrapers are specially made for pipe bowls of different sizes. To remove a knife blade 6 or scraper the screws 7 have to be loosened or the crank handle 4 is unscrewed and the knife blade or scraper is removed from the bracket 1 together with the axle 2.

To clean a pipe bowl the crank handle 4 is turned and the open end of the pipe bowl is pressed against the knife blade 6 which then is shifted to bear against the bracket 1. The knife blade advances into the pipe bowl until the sleeve 8 bearing against the bracket 1 stops the forward movement of the knife blade.

I claim:—

1. An apparatus for cleaning pipe bowls, comprising in combination a bracket, an axle journalled freely longitudinally shiftable and rotatable in said bracket, a crank handle on one end of said axle, a scraper at the other end of said axle and a sleeve slidably and exchangeably mounted on said axle between said crank handle and said bracket designed to limit the longitudinal movement of said axle to prevent damage to the bottom of the pipe bowl when the pipe bowl bears against said bracket.

2. An apparatus for cleaning pipe bowls, comprising in combination a bracket, an axle journalled freely longitudinally shiftable and rotatable in said bracket, a crank handle on one end of said axle, a scraper on the other end of said axle, a sleeve slidably and exchangeably mounted between said crank handle and said bracket adapted to limit the longitudinal movement of said axle, and a tray removably mounted on said bracket under said scraper adapted to catch the residue scraped out of the pipe bowl by said scraper.

In testimony whereof I affix my signature.

KARL BRAUN.